(12) United States Patent
Mittal et al.

(10) Patent No.: US 12,489,549 B2
(45) Date of Patent: Dec. 2, 2025

(54) SYSTEM-LEVEL TECHNIQUES FOR ERROR CORRECTION IN CHIP-TO-CHIP INTERFACES

(71) Applicant: XILINX, INC., San Jose, CA (US)

(72) Inventors: Millind Mittal, Saratoga, CA (US); Krishnan Srinivasan, San Jose, CA (US); Kenneth Ma, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/223,517

(22) Filed: Jul. 18, 2023

(65) Prior Publication Data

US 2025/0030500 A1  Jan. 23, 2025

(51) Int. Cl.
  *H04L 49/9005* (2022.01)
  *H04L 1/00* (2006.01)

(52) U.S. Cl.
  CPC .......... *H04L 1/0041* (2013.01); *H04L 1/0025* (2013.01); *H04L 49/9005* (2013.01)

(58) Field of Classification Search
  CPC .. H04L 1/0041; H04L 1/0025; H04L 49/9005
  See application file for complete search history.

(56) References Cited

U.S. PATENT DOCUMENTS

| | | | | |
|---|---|---|---|---|
| 12,019,571 B1 * | 6/2024 | Yan | | G06F 13/20 |
| 2003/0128716 A1 * | 7/2003 | Harris | | H04L 1/1628 |
| | | | | 370/282 |
| 2007/0275656 A1 * | 11/2007 | Chang | | H04L 1/08 |
| | | | | 455/9 |
| 2007/0286146 A1 * | 12/2007 | Kuroda | | H04L 1/1858 |
| | | | | 370/335 |
| 2009/0022063 A1 * | 1/2009 | Ju | | H04L 1/1825 |
| | | | | 370/252 |
| 2020/0106824 A1 * | 4/2020 | Erkin | | H04L 65/762 |
| 2024/0007404 A1 * | 1/2024 | Amicangioli | | H04L 47/193 |

FOREIGN PATENT DOCUMENTS

| | | | | |
|---|---|---|---|---|
| CN | 108259369 A | * | 7/2018 | ............. H04L 47/13 |
| CN | 112667557 A | * | 4/2021 | |

* cited by examiner

*Primary Examiner* — Guerrier Merant
*Assistant Examiner* — Jeffrey Andrew Yang
(74) *Attorney, Agent, or Firm* — Patterson + Sheridan, LLP

(57) ABSTRACT

Some examples described herein provide for interconnect in chiplet systems, for example system-level techniques for error correction in chip-to-chip interfaces. In an example, a method of error correction includes receiving, at a first chiplet, a data message via a set of interconnect, and transmitting a first control message that requests retransmission of the data message based on detecting an error associated with receiving the data message. The method also includes transmitting one or more instances of a second control message that indicates an idle operation at the first chiplet until the first chiplet receives a third control message that triggers an end of a retransmission mode. The method also includes transmitting a fourth control message frame indicating the end of the retransmission mode, and receiving a retransmission of the data message from the second chiplet.

24 Claims, 10 Drawing Sheets

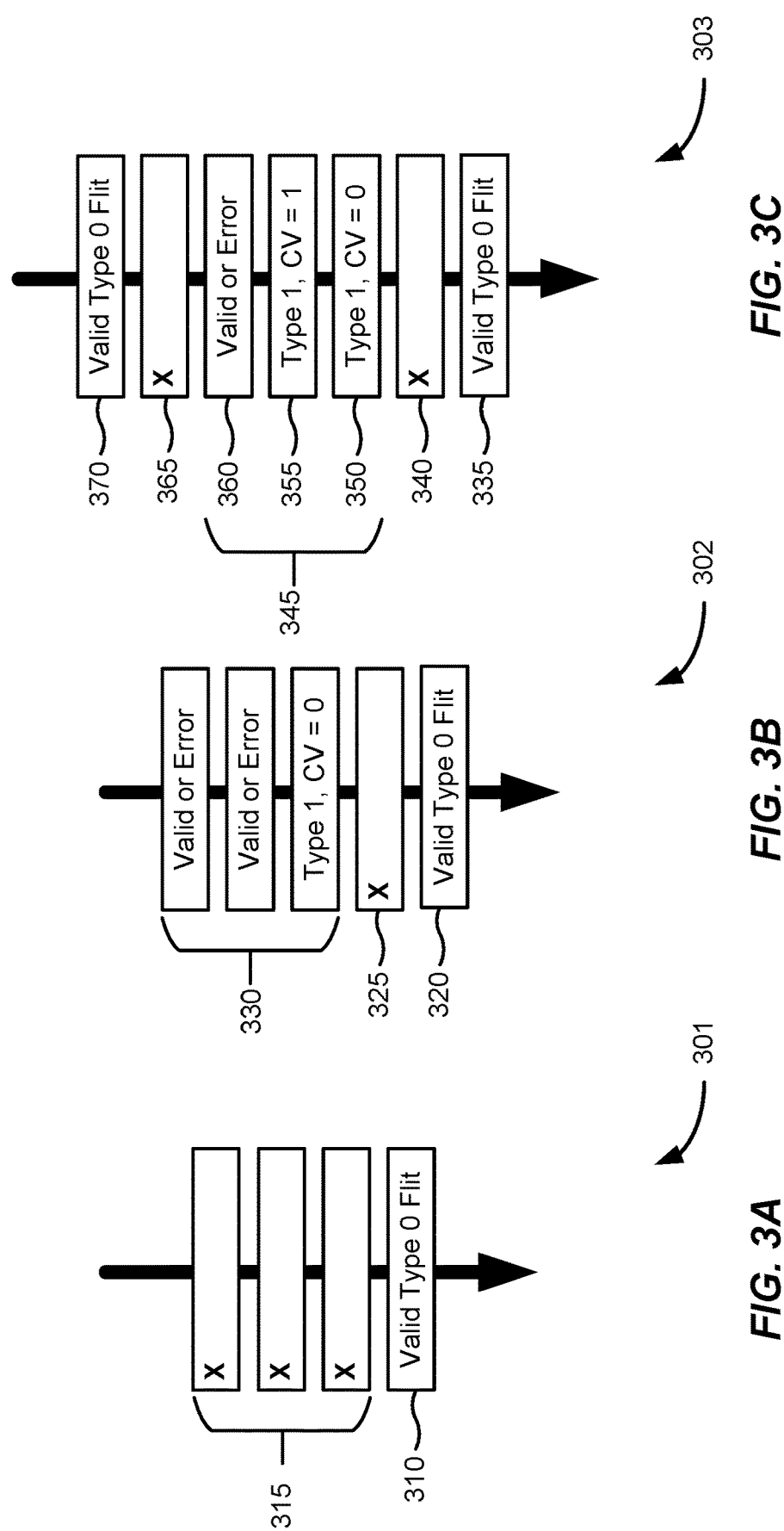

SYSTEM-LEVEL TECHNIQUES FOR ERROR CORRECTION IN CHIP-TO-CHIP INTERFACES

TECHNICAL FIELD

Examples of the present disclosure generally relate to interconnect in chiplet systems, for example system-level techniques for error correction in chip-to-chip interfaces.

BACKGROUND

Traditionally, a single monolithic chip contains all the necessary components and functionalities, such as the central processing unit (CPU), memory, graphics processing unit (GPU), and other peripherals. However, as the complexity and size of these chips have increased, it has become more challenging and expensive to manufacture them with advanced technologies. Chiplet architecture refers to a design approach in semiconductor manufacturing where a single integrated circuit (IC), or chip, is divided into smaller functional blocks called chiplets. These chiplets are then separately fabricated and assembled together on a common substrate to create a complete system-on-chip (SoC) or a larger integrated circuit. Chiplet architecture addresses the challenges of monolithic chips by breaking down a complex chip into smaller, more manageable chiplets. Each chiplet may focus on a specific function or component. For example, there might be separate chiplets for the CPU, GPU, memory controller, and other peripherals. Or, each chiplet may be a separate instance of a same component. These chiplets can be individually designed and optimized for their specific tasks. The benefits of chiplet architecture may include improved manufacturing yields, enhanced performance and scalability, lower development costs and time, and increased flexibility and customization. However, chiplet architectures also present challenges, such as managing power distribution, thermal considerations, and ensuring efficient interconnects.

Chiplets may be interconnected using high-speed interfaces, such as through-silicon vias (TSVs), microbumps, interposers, or other suitable mechanisms. These interconnects provide electrical and data communication between the chiplets, allowing them to work together as a cohesive system. Improved interconnect designs to achieve high bandwidth and low latency are desired to harness the full potential of chiplet-based systems.

SUMMARY

Some examples described herein provide for interconnect in chiplet systems, for example system-level techniques for error correction in chip-to-chip interfaces.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of error correction for chip-to-chip communications in a heterogeneous integration circuitry. The method also includes receiving, from the first chiplet, a data message frame from a second chiplet of the heterogeneous integration circuitry via a set of interconnect between the first chiplet and the second chiplet. The method also includes transmitting a first control message frame that requests retransmission of the data message frame from the second chiplet based at least in part on detecting an error associated with receiving the data message frame from the second chiplet. The method also includes transmitting one or more instances of a second control message frame that indicates an idle operation at the first chiplet until the first chiplet receives, from the second chiplet, a third control message frame that triggers an end of a retransmission mode. The method also includes transmitting a fourth control message frame indicating the end of the retransmission mode. The method also includes receiving, from the second chiplet, a retransmission of the data message frame from the second chiplet. Other embodiments of this aspect include corresponding computer systems, apparatus, and computer programs recorded on one or more computer storage devices, each configured to perform the actions of the methods.

One general aspect includes a first chiplet of a heterogeneous integration circuitry. The first chiplet also includes a first communications interface for chip-to-chip communications with a second communications interface of a second chiplet of the heterogeneous integration circuitry via a set of interconnect. The chiplet also includes communications controller circuitry configured to control the first communications interface to: receive a data message frame from the second chiplet via the set of interconnect; transmit a first control message frame that requests retransmission of the data message frame from the second chiplet based at least in part on detecting an error associated with receiving the data message frame from the second chiplet; transmit one or more instances of a second control message frame that indicates an idle operation at the first chiplet until the first chiplet receives, from the second chiplet, a third control message frame that triggers an end of a retransmission mode; transmit a fourth control message frame indicating the end of the retransmission mode; and receive, from the second chiplet, a retransmission of the data message frame from the second chiplet. Other embodiments of this aspect include corresponding computer systems, apparatus, and computer programs recorded on one or more computer storage devices, each configured to perform the actions of the methods.

One general aspect includes a heterogeneous integration circuitry. The heterogeneous integration circuitry also includes a first chiplet. The circuitry also includes a second chiplet. The circuitry also includes a set of interconnect coupling a first communications interface of the first chiplet with a second communications interface of the second chiplet. The circuitry also includes communications controller circuitry for chip-to-chip communications between the first chiplet and the second chiplet, the communications controller circuitry configured to control the first communications interface to: receive, at the first chiplet, a data message frame from the second chiplet; transmit, to the second chiplet, a first control message frame that requests retransmission of the data message frame from the second chiplet based at least in part on detecting an error associated with receiving the data message frame from the second chiplet; transmit, to the second chiplet, one or more instances of a second control message frame that indicates an idle operation at the first chiplet until the first chiplet receives, from the second chiplet, a third control message frame that triggers an end of a retransmission mode; transmit, to the second chiplet, a fourth control message frame indicating the end of the retransmission mode; and receive, from the second chiplet, a retransmission of the data message frame from the second chiplet. Other embodiments of this aspect include corresponding computer systems, apparatus, and computer programs recorded on one or more computer storage devices, each configured to perform the actions of the methods.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 3A is a first message flow for count value disambiguation for error correction in chip-to-chip interfaces, according to an example.

FIG. 3B is a second message flow for count value disambiguation for error correction in chip-to-chip interfaces, according to an example.

FIG. 3C is a third message flow for count value disambiguation for error correction in chip-to-chip interfaces, according to an example.

DETAILED DESCRIPTION

Figure 1A:
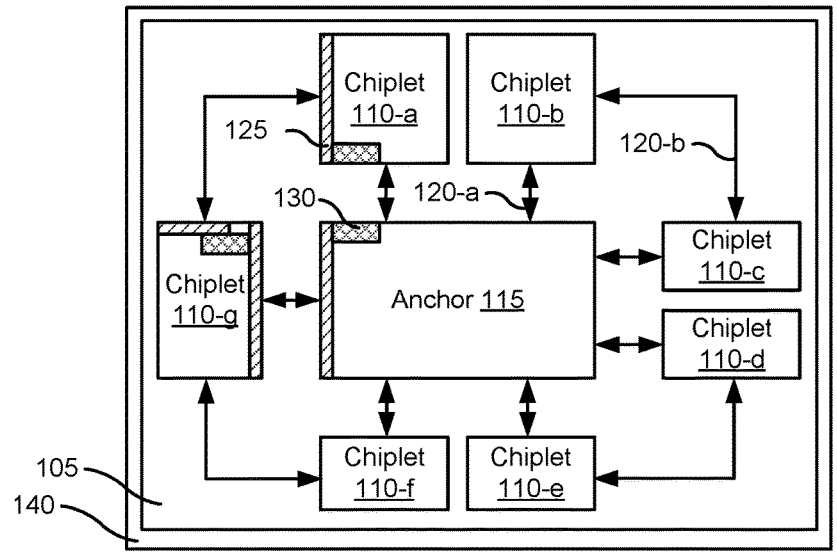
FIG. 1A illustrates block diagram of heterogeneous integration circuitry 101 that includes a chiplet architecture, according to an example.

Some examples described herein provide for interconnect in chiplet systems, for example system-level techniques for error correction in chip-to-chip interfaces. Chip-to-chip interfaces include interconnect between components of heterogeneous integration circuitry, such as chiplets in a chiplet architecture. Chiplets may be interconnected using high-speed interfaces, these chip-to-chip interfaces may include simultaneously (concurrently) bi-directional data flow that can experience transmission and/or reception errors from time to time. Each chiplet, or the chiplet architecture as a whole, may experience a certain bit error rate for inter-chip communications that exceeds a bit error rate threshold from time to time. In some cases, a retransmission scheme can be used to mitigate bit errors. However, such schemes may be relatively slow, complicated, or both. As such, an error-correction mechanism for inter-chiplet traffic is desired to reduce the bit error rate below a threshold.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1A illustrates block diagram of heterogeneous integration circuitry 101 that includes a chiplet architecture, according to an example. The heterogeneous integration circuitry 101 includes a set of chiplets 110, a wiring substrate 105, and a package substrate 140.

The set of chiplets 110 can include one or more interconnected chiplets (e.g., a first chiplet 110-*a*, a second chiplet 110-*b*, a third chiplet 110-*c*, a fourth chiplet 110-*d*, a fifth chiplet 110-*e*, a sixth chiplet 110-*f*, a seventh chiplet 110-*g*). In some cases, each chiplet 110 is a separate instance of a same design. In other cases, the chiplets of chiplets 110 are two or more different designs. Each chiplet can be a single monolithic chip.

In one or more embodiments, different chiplets 110 can be or include different types of components. For example, one or more of the chiplets 110 can be or include an active optical and/or photonic device (e.g., for generating or sensing an optical signal, such as photodiodes, light-emitting diodes, or the like), be or include an electrical device (e.g., a die comprising a processor, a programmable logic IC, an ASIC, or the like), be or include one or more passive components (e.g., resistors, capacitors, inductors, antenna elements or arrays, or the like) or be or include one or more mechanical or electromechanical components (e.g., accelerometers, gyroscopes, pressure sensors, or the like).

The heterogeneous integration circuitry 101 includes a wiring substrate 105. In one or more embodiments, the wiring substrate 105 may be or be referred to as an interposer. Each chiplet 110 is attached to a first side of the wiring substrate 105. The attachment in some examples is a physical and/or electrical connection, such as microbumps or the like. In one or more embodiments, a second side of the wiring substrate 105 (opposite from the first side of the wiring substrate 105) is attached to a package substrate 140 by one or more connectors, for example, controlled collapse chip connections (C4) or the like, and can form an electrical connection and physical attachment between the wiring substrate 105 and the package substrate 140. External connectors (not shown) are attached to a second side of the package substrate 140 (opposite from the first side of the package substrate). The external connectors can be, for example, ball grid array (BGA) balls, or the like, and may be used to attach the package substrate 140 to a printed circuit board (PCB) or other suitable substrate (not shown).

Chiplets 110 are connected to the anchor chip 115 via interconnect 120-*a*. In addition to interconnect 120-*a*, one or more chiplets 110 may also be connected to each other via interconnect 120-*b*. Interconnect 120 may also be or be referred to as a communication interface (e.g., a chip-to-chip interface). In some cases, anchor chip 115 may be absent, and chiplets 110 are connected to each other via interconnect 120-*a*, but not through an anchor chip 115. Interconnect 120 are routed at least partially through the wiring substrate 105 using one or more contacts, bumps, traces, leads, vias, or other electrical or optical conductors. Each interconnect 120 can be one or more individual signal, power, ground, or other lines (e.g., forming a bus with multiple signal lines). Additional or fewer of interconnect 120 may be present or absent consistent with the disclosure herein.

In one or more embodiments, one or more chiplets 110 and/or anchor chip 115 include at least one communication interface 125 coupled with the interconnect 120. Each communication interface 125 can be controlled by communications controller circuitry 130 to perform one or more features, functions, steps, etc., described herein. In one or more embodiments, a communication interface 125 associated with one chiplet 110 (or anchor chip 115) can control or be controlled by a communications controller circuitry 130 of a different chiplet 110 (or anchor chip 115). In some embodiments, communications controller circuitry 130 can control multiple communication interfaces 125 of one or more chiplets 110 (or anchor chip 115). In some embodiments, communications controller circuitry 130 is part of or communicatively coupled with heterogeneous integration circuitry 101, but externals to one or more of chiplets 110 or anchor chip 115. For clarity, one or more instances of communication interfaces 125 and communications controller circuitry 130 are not shown for heterogeneous integration circuitry 102.

In one or more embodiments, one or more of chiplets 110 or anchor chip 115 uses a first in first out (FIFO) buffer as part of communications via interconnect 120. In some examples, the FIFO buffer is part of a communication interface 125. In some embodiments, a depth of the FIFO buffer is based at least in part on an error statistic for communications between chiplets 110 (or with anchor chip 115) via the set of interconnect 120. In some embodiments, the error statistic is a bit error rate, a throughput, a latency, or any combination of these. In some embodiments, the FIFO depth can be sized at design-time based on the error statistic(s).

Figure 1B:
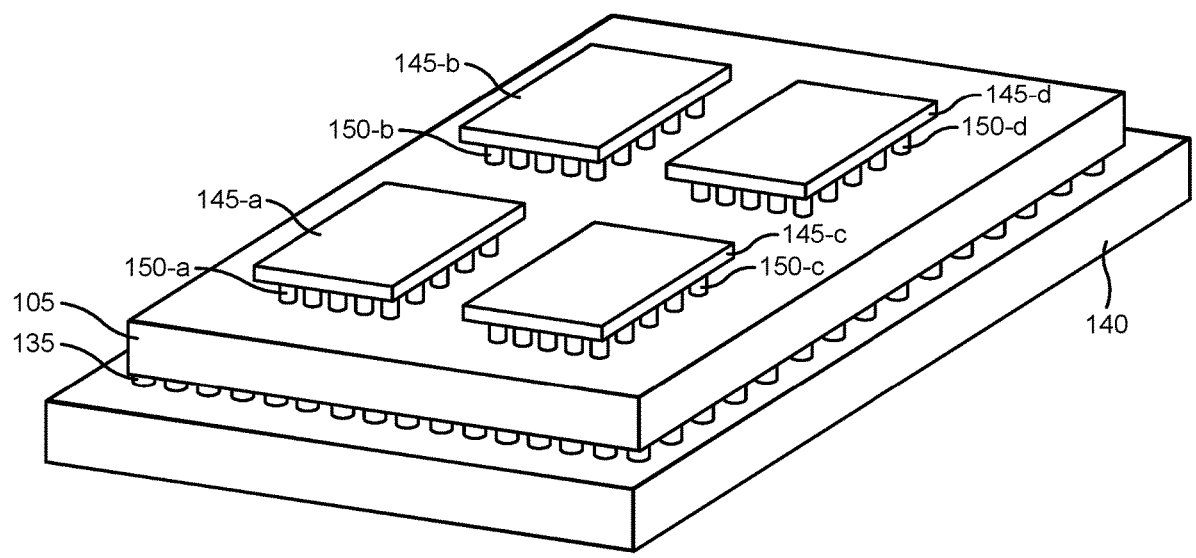
FIG. 1B illustrates an isometric view of a heterogeneous integration circuitry 102 that includes a chiplet architecture, according to an example.

FIG. 1B illustrates an isometric view of a heterogeneous integration circuitry 102 that includes a chiplet architecture, according to an example. The heterogeneous integration circuitry 102 includes a set of components 145, including a first component 145-*a*, a second component 145-*b*, a third component 145-*c*, and a fourth component 145-*d*. Each of components 145 may be an example of a chiplet 110 or an anchor chip 115.

The heterogeneous integration circuitry 101 includes a wiring substrate 105. In one or more embodiments, the wiring substrate 105 may be or be referred to as an interposer. Each of the components 145 are attached to a first side of the wiring substrate 105 by connectors 150 (e.g., external connectors). The first component 145-*a* is attached to the first side of the wiring substrate 105 by connectors 150-*a*. The second component 145-*b* is attached to the first side of the wiring substrate 105 by connectors 150-*b*. The third component 145-*c* is attached to the first side of the wiring substrate 105 by connectors 150-*c*. The fourth component 145-*d* is attached to the first side of the wiring substrate 105 by connectors 150-*d*. The connectors 150 can be, for example, microbumps or the like, and can form an electrical connection and physical attachment between each of the components 145 and the wiring substrate 105. The connectors 150 may form (e.g., along with traces, vias, and other conductors) a portion of interconnect 120.

In one or more embodiments, a second side of the wiring substrate 105 (opposite from the first side of the wiring substrate 105) is attached to a first side of a package substrate 140 by external connectors 135. The external connectors 135 can be, for example, controlled collapse chip connections (C4) or the like, and can form an electrical connection and physical attachment between the wiring substrate 105 and the package substrate 140. External connectors (not shown) are attached to a second side of the package substrate (opposite from the first side of the package substrate). The external connectors can be, for example, ball grid array (BGA) balls or the like, and may be used to attach the package substrate 140 to a printed circuit board (PCB) (not shown).

Although four components 145 are illustrated, consistent with the disclosure herein, a different quantity of components 145 may be attached to wiring substrate 105. The arrangements of each chiplet 110, anchor chip 115, each component 145, wiring substrate 105 (e.g., an interposer), and package substrate 140 is for illustration purposes. The heterogeneous integration circuitry can have different configurations with more or fewer components, or arranged accordingly to other architectures, consistent with the disclosure herein In one or more embodiments, one or more components 145 (e.g., chiplets 110) may be vertically stacked. For example, component 145-*a* can be affixed to a top side of component 145-*b* and connected thereto using connectors 150-*b*, and component 145-*b* can be further connected to wiring substrate 105. One or more conductors of heterogeneous integration circuitry 101, heterogeneous integration circuitry 102, or both, are through-silicon vias (TSVs). TSVs allow efficient vertical communication across multiple stacks which helps chip-design to overcome challenge with limitations of Moore's law. TSVs provide connectivity with low-power signature, smaller form-factor, higher performance, and function density.

Chip-to-chip interconnect (e.g., interface wires) such as interconnect 120 can operate at high transmission rate (e.g., more than 8 Giga-transfers per second per wire). At these high rates, the wires are prone to errors. Using a link characterization technique, a probability distribution of the expected number of errors on a link can be obtained. This distribution can then be used to choose an appropriate error mitigation mechanism for the chip-to-chip interconnect.

Typical error mitigation mechanisms (e.g., single error correction-double error detection (SEC-DED) based mechanism) that correct one-bit error and detect two-bit error without the requirement of retransmission, or a more aggressive mechanism such as a cyclic redundancy check (CRC) that have the ability of detecting multi-bit errors, do not have inherent mechanism to correct the errors. CRC based mechanisms require a retry logic to correct errors. Additionally, CRC based error correction mechanisms rely on the probability of multiple back to back erroneous transmissions being low or extremely low, such that an error can be corrected by retrying the same transmission.

Chip-to-chip interconnect such as interconnect 120 includes bidirectional data flow. The requirement of a low bit-error-rate (e.g., below some threshold value) necessitates the use of an error correction mechanism. Described herein is a retry based error correction mechanism. The described error correction mechanism includes methods, apparatuses, and systems for a comprehensive retry-based error correction mechanism for a chip-to-chip interface. One or more features of the discussed techniques includes that data Flits are encoded to transmit control Flits and thus remove the need for extra control signals.

As used herein, a "Flit" is or denotes a unit of transfer between two chips (e.g., between two chiplets 110, between a chiplet 110 and the anchor chip 115, and so on) over the chip-to-chip interface (e.g., interconnect 120). The terms "Flit," "IDL Flit," and message frame may be used interchangeably. Herein, two types of Flits are disclosed for use in communications over the chip-to-chip interface. The first Flit type may be referred to herein as a "Type-0" Flit, which carries data between the two interfaces. As used herein, a Type-0 Flit may be or be referred to as a data message frame. The second Flit type may be referred to herein as a "Type-1" Flit, which carries control data between the two interfaces. As used herein, a Type-1 Flit may be or be referred to as a control message frame. As further described herein, Type-0 Flits are used to carry data between the two interfaces (e.g., under normal operation). When a CRC error is detected, the interface changes to error correction mode, and Type-1 Flits are transferred until the error has been corrected. The details of Type-0 and Type-1 Flits are described below.

As used herein, a transmitter (TX) of a chip, chiplet, or a device transmits a Flit over a chip to chip interface (e.g., interconnect 120), and a receiver (RX) of a chip, chiplet, or a device receives a Flit over the chip to chip interface (e.g., interconnect 120). An initiator is the device initiating the communications on the link, and the responder is the device transmitting communications responsive to the communications on the link.

Figure 2A:
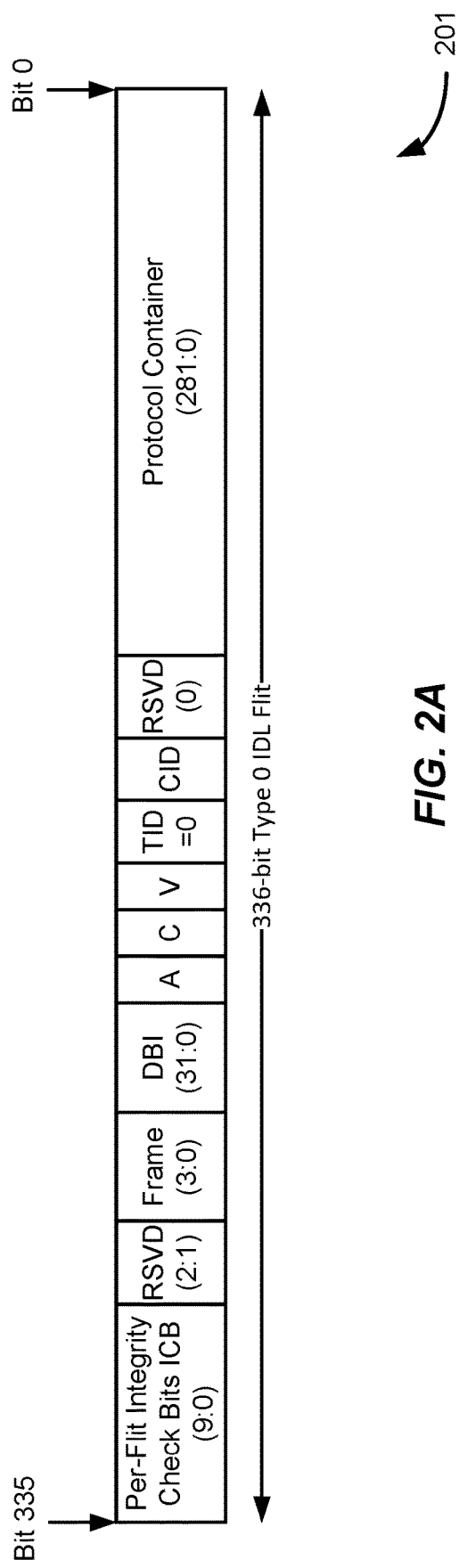
FIG. 2A illustrates a message frame for error correction in chip-to-chip interfaces, according to an example.

FIG. 2A illustrates a message frame 201 for error correction in chip-to-chip interfaces, according to an example. Message frame 201 may be referred to as a Type-0 Flit herein. Message frame 201 includes a quantity of bits (e.g., 10 bits) in a per-Flit integrity check bits (ICB) field, a quantity of bits (e.g., 2 bits) in a first reserved (RSVD) field, a quantity of bits (e.g., 4 bits) in a frame field, a quantity of bits (e.g., 32 bits) in a data bus inversion (DBI) field, an acknowledgement bit (A), a credit bit (C), a valid bit (V), a quantity of bits (e.g., 1 bit to indicate the Type-0 Flit) in a type ID (TID) field, a quantity of bits (e.g., 1 bit) of a protocol container ID (CID) field, a quantity of bits (e.g., 1 bit) of a second RSVD field, and a quantity of bits (e.g., 282 bits) of a protocol container (PC) field.

Figure 2B:
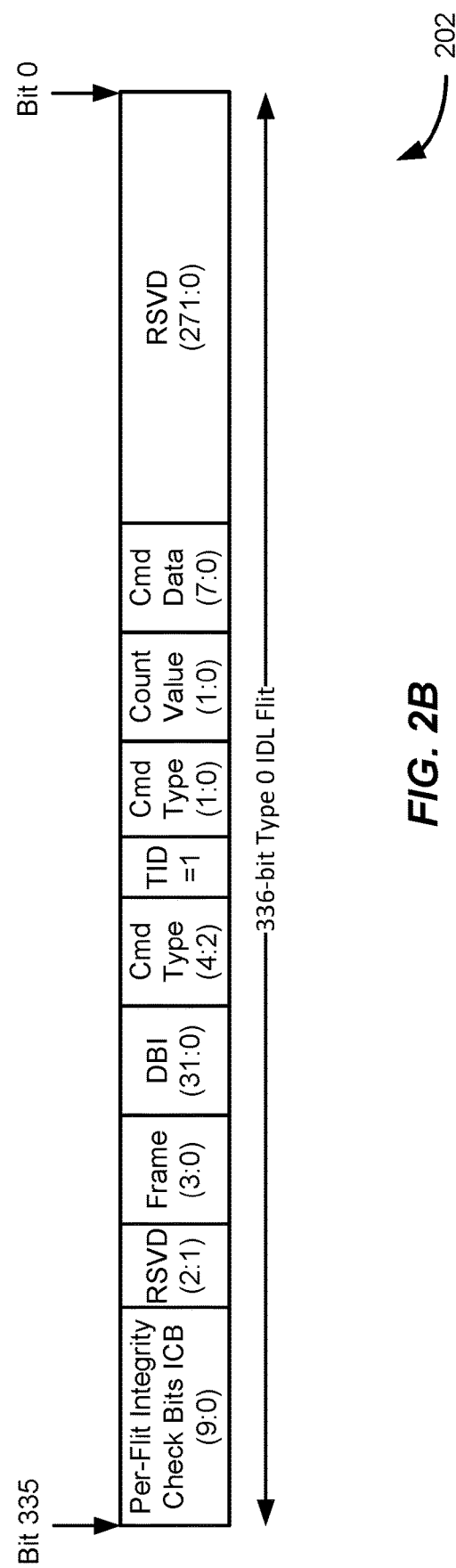
FIG. 2B illustrates a message frame for error correction in chip-to-chip interfaces, according to an example.

FIG. 2B illustrates a message frame 202 for error correction in chip-to-chip interfaces, according to an example. Message frame 202 may be referred to as a Type-0 Flit herein. Message frame 201 includes a quantity of bits (e.g., 10 bits) in a per-Flit ICB field, a quantity of bits (e.g., 2 bits) in a first reserved (RSVD) field, a quantity of bits (e.g., 4 bits) in a frame field, a quantity of bits (e.g., 32 bits) in a DBI field, a first quantity of bits (e.g., 3 bits) of a command type (Cmd type) field, a quantity of bits (e.g., 1 bit to indicate the Type-1 Flit) in a TID field, a second quantity of bits (e.g., 2 bits) of the Cmd type field, a quantity of bits (e.g., 2 bits) of a count value (CV) field, a quantity of bits (e.g., 8 bits) of a command data (Cmd data) field, and a quantity of bits (e.g., 272 bits) of a RSVD field.

The per-Flit ICB field includes a quantity of cyclic redundancy check CRC bits (e.g., 10-bits). In some embodiments, CRC field implements polynomial 0x247. This polynomial provides a hamming distance of 4 and therefore, the ability to detect 3 random errors. In one or more embodiments, the CRC covers all other fields, inclusive of Bits [325:0], of the IDL Flit. For the transmitter, the CRC generation is the last processing step before IDL Flit is transferred to the PHY. For receiver, the IDL Flit processing can proceed in parallel to CRC computation for the received IDL Flit. In some embodiments, the BER can be less than 1e-25, which is low enough that in case a detection of CRC error, it can be treated as exception error event.

The "A" Acknowledgement bit, when set, indicates that one additional valid Type 0 Flit is received by the Responder. The "C" Credit bit, when set, indicates a credit return to TX by the RX. The "V" Valid bit, when set, indicates to the receiver that the Protocol Container field of the IDL Flit is valid and the Flit will consume a credit (would need to be buffered) on the Responder.

The TID bit, Type ID field, defines the type of the Flit. Type 0 (TID=0) indicates that it is a Data Flit and is subject to optional Retry mechanism for robustness. When the link is operating in normal "Active" mode, the Initiator transmits one Type 0 Data Flit every clock. If a Type 0 Flit is received with error and the retry mechanism is turned on, the Responder enters Retransmission mode. Retransmission mode utilizes Type 1 Flits for notification to the Initiator and subsequent synchronization with the Responder.

A Type 0 Flit with A, C, V and CID fields all cleared will be treated as an Idle Flit. Once the link enters Active mode, a Flit can be transmitted every clock. In one or more embodiments, there is no suppressing or stopping the Flit transmission. If the Initiator does not have any data-carrying Flit to send, the Initiator will send Type 0 Idle Flit (IF0) in case there is an entry available in the Initiator TX Retransmit buffer, until a valid protocol payload is available to be sent. In one or more embodiments, all 0's values can be sent in Protocol Container or PC during IF0 transmission.

If there is no entry available in the Initiator Retransmit buffer, the Initiator can transmit Type 1 Idle Flits (IF1) that do not need to be tracked by the TX Retransmit buffer.

The following Type 0 Flits are defined:

| A | C | V | CID | TID = 0 | Type of Flit |
|---|---|---|-----|---------|--------------|
| 0 | 0 | 0 | 0 | 0 | Type 0 Idle Flit (IF0) |
| x | x | 1 | 0 | 0 | Protocol Container valid. Consumes a credit in Responder |
| x | 1 | x | 0 | 0 | Initiator returns a credit to Responder |
| 1 | x | x | 0 | 0 | Responder indicate acknowledgement to Initiator the reception of a Type 0 Flit without error |

Protocol Container ID (CID) allows for a given protocol to utilize two different types of containers for mapping the protocol fields. Typically, CID=0 is used for carrying protocol fields that may change every clock (for example, data transfer fields), and CID=1 is used for carrying infrequently changing independent protocol control fields. It is up to the IDL Adaptation Layer to determine how to utilize CID=1 to carry the specific protocol controls. For several common protocols, it may be sufficient to utilize CID=0. Note that, if CID=1 and some Type 0 Flit data fields are not defined or used for a specific protocol, in one or more embodiments, those bits can be driven to "0" by TX and ignored by RX.

The PC field (e.g., Protocol Container [281:0]), is an opaque field that carries the 282-bit IDL protocol container provided by IDL Adaptation layer. This field is defined for Type 0 Flit (e.g., message frame 201), but not for Type 1 Flit (e.g., message frame 202). In one or more embodiments, all "0" values are sent in PC during IF1 transmission.

The reserved field (e.g., including the first RSVD field, the second RSVD field, or both) are driven to "0" by TX and ignored by RX.

In one or more embodiments, the Type 1 (TID=1) Flit (e.g. using message frame 202) is a Control Flit, utilized by IDL layer for inter-IDL layer communication with control information. In one or more embodiments, the Type 1 Flits are sent as a group of "r" duplicated copies, referred to as r-tuple, where "r" can be configured from 2 to 4 depending upon expected bit error ratio (BER) of the link (e.g., a link including a set of interconnect 120 between two or more chiplets and/or anchor chips). In one or more embodiments, the bit fields specific to the Type 1 Flit (e.g. using message frame 202), include Cmd type field, Cmd data field, and count value field.

The Cmd type field (e.g., 5 bits) indicates command types to support IDL link initialization and Retransmission protocol, as follows:

track of the number of Type 0 Flits received successfully, but not yet acknowledged. In case it detects that its TX Retransmit Buffer is full and it is not able to send acknowledgement back to the Initiator, it can utilize AF command with Ack-count up to the number of received Flits that it intends to acknowledge.

The Count Value (e.g., 2 bits) field defines the number count of this Type 1 Flit within the "r-tuple" or "r" duplicated copies of the Flit. This can allow disambiguation of a Type 1 Flit which is part of an r-tuple received in error, from the next Type 1 Flit r-tuple. For example, message flows 400, 500, and 600 illustrate examples of how count value can allow disambiguating whether incoming Flit with error is Type 0 or Type 1. The examples use a value of r=3 in a "r-tuple", for example for reliable transport of Type 1 Flits, each Flit is transmitted 3 times. In some embodiments, "r" of 3 is chosen when the reliability of the link is such that the probability of error on 3 consecutive Flits is relatively small, for example close to or about zero.

Message frame 201 and message frame 202 may be 336 bits in some examples, though other quantities of bits (e.g., a greater or fewer number of bits, such as a large or smaller quantity of bits in the protocol container (e.g., greater or fewer than 282 bits)) may be used consistent with the disclosure herein. For example, the OCP ODSA OpenHBI (Open High Bandwidth Interconnect) chip to chip (C2C) chiplet interface standard is used as reference. The number of bits in the Type 0 Flit and Type 1 Flit, the size (e.g., quantity of bits) of the Protocol Container and the encoding of the control and sideband signals and the cyclic redundancy check (CRC) code can be easily adapted to optimize

| Command Type (4:0) | TID = 1 | Type 1 Flit type |
|---|---|---|
| 00000 | 1 | Type 1 Idle Flit (IF1) |
| 00001 | 1 | RR: Request to Resend |
| 00010 | 1 | RR_Ack: Request to Resend Acknowledgement |
| 00011 | 1 | RR_E: Request to Resend End |
| 00100 | 1 | Ack Flit (AF); Used for communication between IDL layers for sending Acks from Responder to Transmitter. The Ack-count value is provided in the Command Data [7:0] field. |
| All other values | 1 | Reserved |

The Cmd data field (e.g., 8 bits) contains, optionally, data associated with the Command Type. In some examples, the Command Data fields include at least a receive count and an acknowledgment count. In one or more embodiments, for Command Types that do not have a Command Data field, the Command Data [7:0] is driven to "0" by TX and ignored by RX.

The receive count (RX-count) Data Field can include RX-count is the data field sent with Request to Resend (RR) Type 1 command. RX-count is a free running 8-bit counter with the Responder that counts the number of Type 0 Flits that have been received correctly at a given clock after the Responder has entered the IDL Active mode. The RX-count value wraps around after 255. RX-count value received with the RR command can be used by the Initiator TX to determine the exact offset into its TX Retransmit buffer that corresponds to the Type 0 Flit entry that is received by the Responder with error. For example, if an Initiator has 8 entry deep TX Retransmit buffer, the index of the entry to be retransmitted is (RX-count) Mod 8.

The acknowledgement count (Ack-count) data field for Acknowledge Flit (AF) Type 1 command. Responder keeps for different C2C interfaces that have different number of data wires (e.g., 42) and using different gearbox ratio (e.g., 8:1) between the C2C signal wire data rate (e.g., 8 Gbps) and the internal logic circuit frequency (e.g., 1 GHZ).

FIGS. 3A, 3B, and 3C illustrate examples of how count value (e.g., using the count value field of message frame 202) can allow disambiguating whether incoming Flit with error is Type 0 or Type 1. The examples use a value of r=3 in a "r-tuple," for example for reliable transport of Type 1 Flits, each Flit is transmitted 3 times. In some embodiments, "r" (threshold quantity of duplicated copies of a Flit) of 3 is chosen when the reliability of the link is such that the probability of error on 3 consecutive Flits is extremely small, for example close to or about zero. In other embodiments, a value greater or less than r=3 can be used, for example to obtain higher reliability (a greater r value) or when less reliability is tolerable (a lower r value, such as r=2).

FIG. 3A is a first message flow 301 for count value disambiguation for error correction in chip-to-chip interfaces, according to an example. At 310, a valid Type 0 Flit is received. At 315, a quantity of Flits are received in error, and the quantity exceeds a threshold quantity (e.g., "r"). In one or more embodiments, the RX can trigger an error notification to initiate an indication of a link down.

FIG. 3B is a second message flow 302 for count value disambiguation for error correction in chip-to-chip interfaces, according to an example. At 320 a valid Type 1 Flit is received. The Flit received at 325 is in error which is implied as Type 0 since the Flit (as a 3-tuple) that follows at 330 is a valid Type 1 Flit with CV=0 indicated.

FIG. 3C is a third message flow 303 for count value disambiguation for error correction in chip-to-chip interfaces, according to an example. The Flit received at 340 is in error which is implied as Type 0 since the Flit at 335 is a valid Type 0 Flit and the Flit (as a 3-tuple) that follows at 350 is a valid Type 1 Flit with CV=0 indicated. At 355 a valid Type 1 Flit with CV=1 is received. At 360 a valid or error Flit received is implied as a last beat of a Type 1 Flit 3-tuple. At 365, the Flit received in error is implied as a Type 0 Flit by the receipt of the Flit 3-tuple at 350, 355, and 360, and a valid Type 0 Flit is received at 370.

Figure 4:
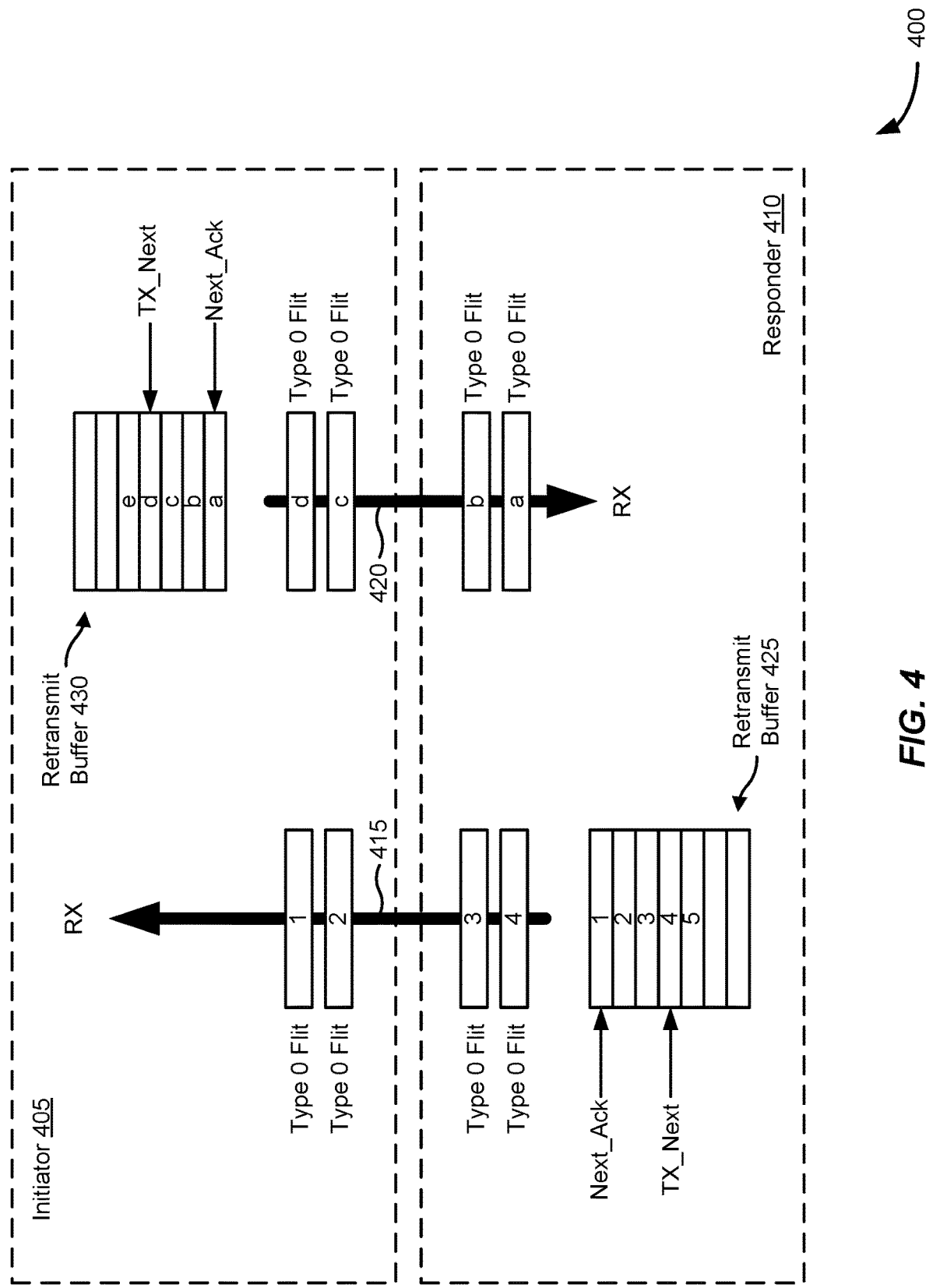
FIG. 4 is a message flow for error correction in chip-to-chip interfaces, according to an example.

FIG. 4 is a message flow 400 for error correction in chip-to-chip interfaces, according to an example. In one or more embodiments, message flow 400 is between an initiator die 405 (e.g., a chiplet 110, or anchor chip 115) and a responder die 410 (e.g., another chiplet 110, or anchor chip 115) of a heterogeneous integration circuitry (e.g., heterogeneous integration circuitry 101, heterogeneous integration circuitry 102). In one or more embodiments, message flow 400 illustrates a normal Flit flow between the initiator and responder.

Initiator 405 includes a retransmit buffer 430, and responder 410 includes a retransmit buffer 425. A first set of interconnect lines 415 (e.g., at least a portion of interconnect 120) form a path from responder 410 to initiator 405 via interconnect lines 415, and a second set of interconnect lines 420 (e.g., at least a portion of interconnect 120) form a path from initiator 405 to responder 410.

In one or more embodiments herein, an IDL layer defines an optional Retry (which may also be or be referred to as a Retransmission) mechanism for future physical layer (PHY) definitions where the error rate may be higher than an acceptable reliability target or threshold. The TX IDL layer is expected to implement Retransmit buffer of sufficient depth to allow stall free transport of IDL Flits. The retry scheme of IDL layer is optimized for bandwidth and the size for of the Retransmit buffer. For optimal performance, the round-trip latency of the acknowledgement should be less than the depth of the Retransmit buffer on either side (e.g. retransmit buffer 430 of initiator 405, retransmit buffer 425 of responder 410) of the link (which are known in advance in some embodiments). In one or more embodiments, each anchor chip 115 and/or chiplet 110 side provides the TX and RX latency for its OpenHBI PHY+Logical PHY layers. Additionally, in some embodiments, each die provides the depth of the retransmit buffer.

In case the link BER is higher than some threshold value (e.g., 1e-25) and requires the use of retry mechanism, if the sum of the PHY round trip latency of each die is greater than the depth of the Retransmit buffer depth on either side, initialization process may choose to disable the link. It can also enable the link even though the link may not operate at full performance. In case the Retransmit buffer is filled, Initiator TX utilizes Type 1 Idle Flits (IF1) as "fillers" to fill the TX slots as these Flits are tolerant to link errors and do not require to be stored in the Retransmit buffer.

After entering the IDL "Active Mode," each side of the link starts to send valid Type 0 Flits across the link. These Flits (Flit with valid Protocol Container, Flit with only credit transfer, Ack only Flits or IF0 Flits) continue to flow in each direction every TX clock until a Flit is received with error. At the point of reception of an error, Flit flow now enters Retransmission mode. The sections below describe how to achieve reliable Flit delivery based on the retry mechanism. The descriptions below are defined in terms of initiator 405 and responder 410. Note that in one or more embodiments, the link (e.g., the first set of interconnect lines 415 and the second set of interconnect lines 420 of interconnect 120) is bidirectional and architecturally each side operates as Initiator and Responder simultaneously.

According to message flow 400 (e.g., in a normal Flit flow mode), a retry mechanism is based on explicit acknowledgement of flow of Flits in each direction (e.g., from initiator 405 to responder 410, and from responder 410 to initiator 405). From the PHY perspective there is a Flit that is transmitted by initiator 405 to the responder 410. Each received Type 0 Flits by initiator 405 with A bit set operates as an acknowledgement for a Flit for Type 0 Flit flowing in the opposite direction.

According one or more embodiments, message flow 400 includes counting the quantity (number) of Type 0 Flits (TID=0) received, for example using an 8-bit RX-count data filed. Message flow 400 further includes counting the quantity (number) of Acks received. The "Next_Ack" point advances and wraps around at the responder retransmit TX buffer size. Message flow 400 further includes sending an Ack for received Type 0 Flits (AF) with the Ack-count. Message flow 400 further includes, if there is no room in the TX retransmit buffer, and there is no Ack to be sent to the initiator, sending IF1 as "filler" Flits.

Figure 5:
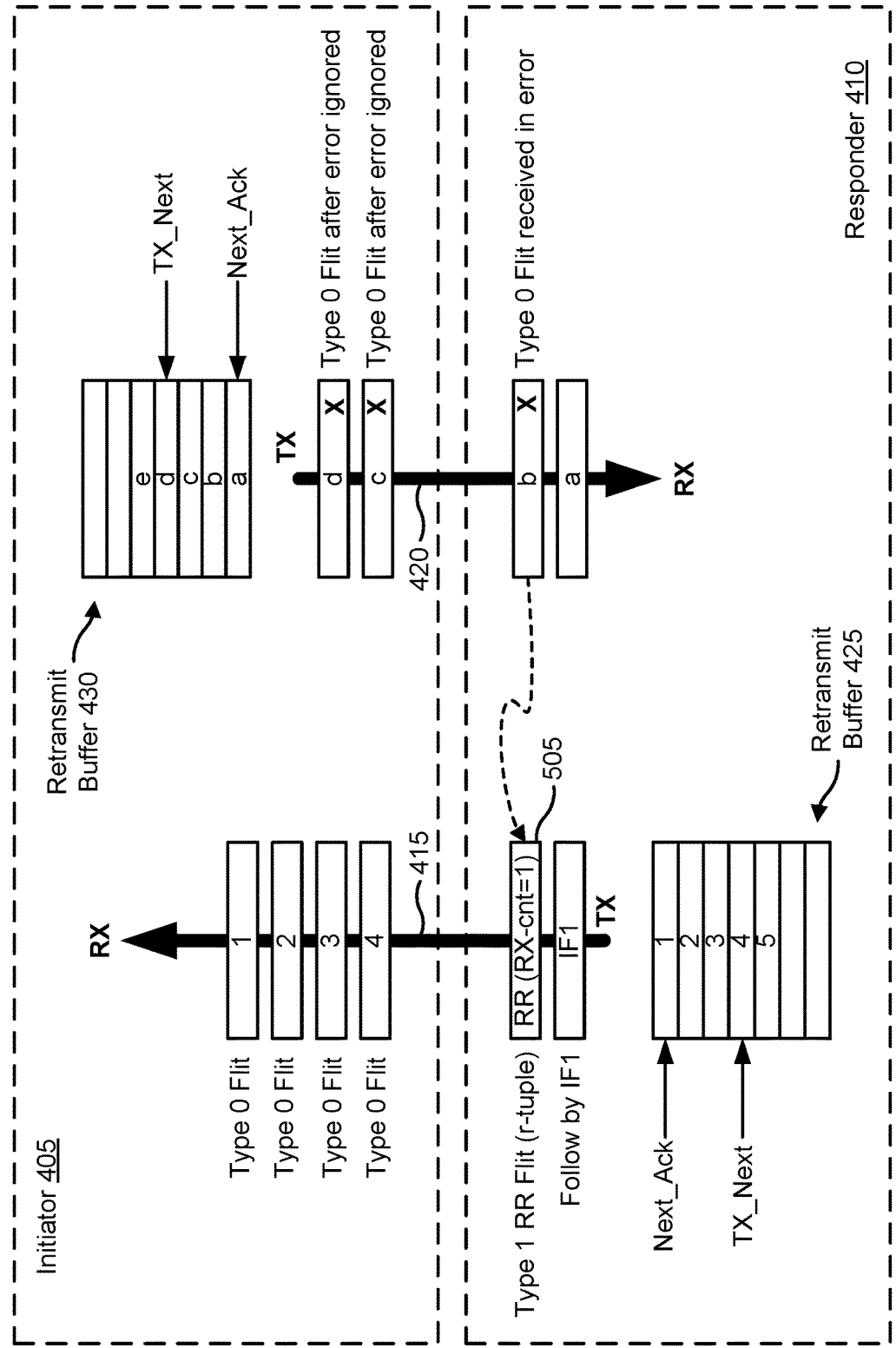
FIG. 5 is a message flow for error correction in chip-to-chip interfaces, according to an example.

FIG. 5 is a message flow 500 for error correction in chip-to-chip interfaces, according to an example. In one or more embodiments, message flow 500 is between an initiator die 405 and a responder die 410, as further described herein. In one or more embodiments, message flow 500 illustrates a Flit flow in a retransmission mode between the initiator 405 and responder 410, where an error is detected on one side (e.g., detected by initiator 405 or responder 410).

According to one or more embodiments, for message flow 500, a Flit arriving at responder 410 has an error, and responder 410 enters a retransmission mode in response. In the retransmission mode, message flow 400 includes responder 410 sending (transmitting) a Type 1 RR (Request to Resend) Flit to initiator 405 as an r-tuple. Note, the value "r" is programmed (configured, preconfigured, predetermined) by the configuration software. In one or more embodiments, all Type 1 Control Flits are sent as an r-tuple.

In one or more embodiments, message flow 500 further includes that the responder 410 (Responder RX) starts to drop (ignore) all incoming Type 0 Flits and, on the TX of responder 410, starts transmitting Type 1 Idle Flits (IF1) until responder 410 receives RR_Ack Flit on its RX interface (e.g., via interconnect lines 420).

Figure 6:
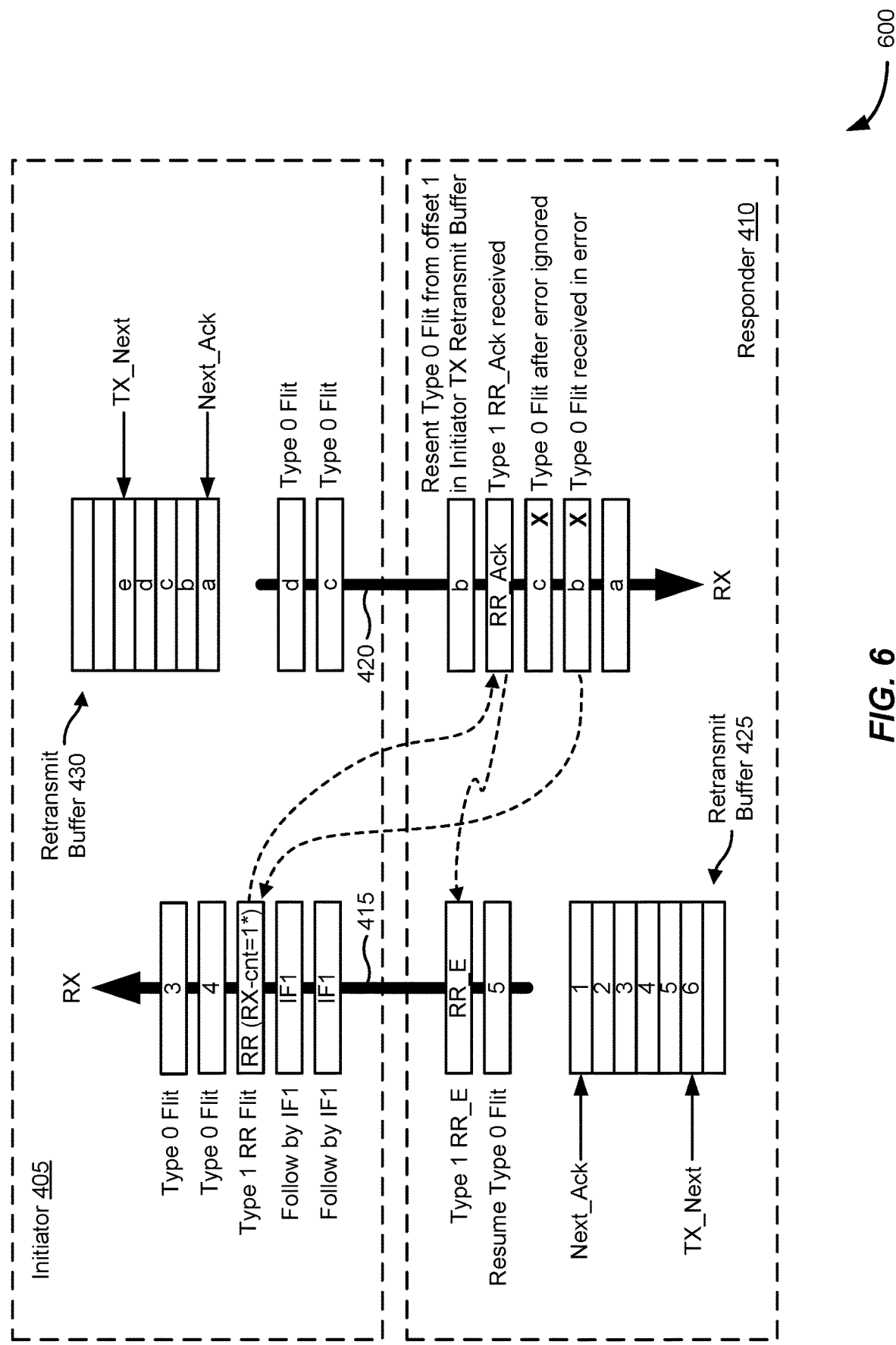
FIG. 6 is a message flow for error correction in chip-to-chip interfaces, according to an example.

FIG. 6 is a message flow 600 for error correction in chip-to-chip interfaces, according to an example. In one or more embodiments, message flow 600 is between an initiator die 405 and a responder die 410, as further described herein. In one or more embodiments, message flow 600 illustrates a Flit flow in a retransmission mode between the initiator 405 and responder 410, where an error is detected on one side (e.g., detected by initiator 405 or responder 410), and includes one or more of the elements of message flow 500.

Message flow 600 further includes that the initiator 405, upon receiving the RR Flit, sends RR_Ack Flit, and then starts to resend the Type 0 Flits from the Retransmit buffer from the last unacknowledged Flit.

Message flow 600 further includes that the responder 410, upon receiving RR_Ack Flit on its RX, sends RR_E Flit to mark the end of the Retransmission mode. Subsequent to this, it sends the last Type 0 Flit ("TX_Next" pointer) queued up for transmission.

Message flow 600 further includes that the initiator 405, on reception of Type 0 Flit, transitions back to Normal Flit Flow mode. Initiator 405 now continues to receive a new Type 0 Flit until next error is encountered by Responder 410.

According to message flow 500, one or more of the Type 1 RR, RR_Ack, RR_E, IF1 Flits are sent as r-tuples, where "r" can be configured from 2 to 4 depending on the expected BER.

Figure 7:
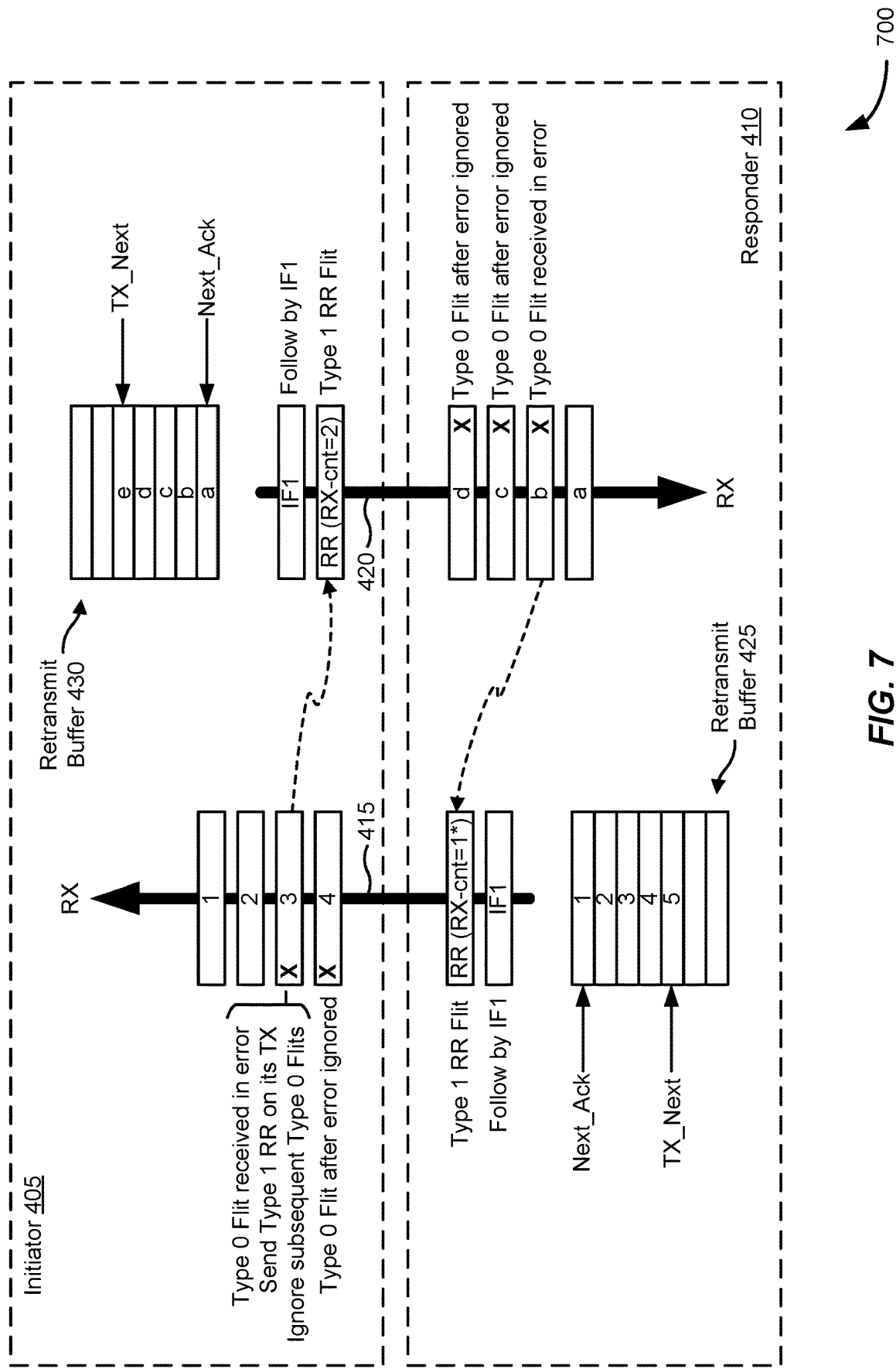
FIG. 7 is a message flow for error correction in chip-to-chip interfaces, according to an example.

FIG. 7 is a message flow 700 for error correction in chip-to-chip interfaces, according to an example. In one or more embodiments, message flow 700 is between an initiator die 405 and a responder die 410, as further described herein. In one or more embodiments, message flow 700 illustrates a Flit flow in a retransmission mode between the initiator 405 and responder 410, where an error is detected on both sides (e.g., errors detected by both initiator 405 and responder 410).

In the case an Initiator RX 405 encounters an error before receiving an inbound RR sent by the Responder 410 (indicating Responder 410 received Type 0 Flit in error), the Initiator will queue up an RR Flit to transmit to Responder 410. In this case, the Responder 410 will see an inbound RR instead of RR_Ack from Initiator 405 (as in the case of message flow 600).

Figure 8:
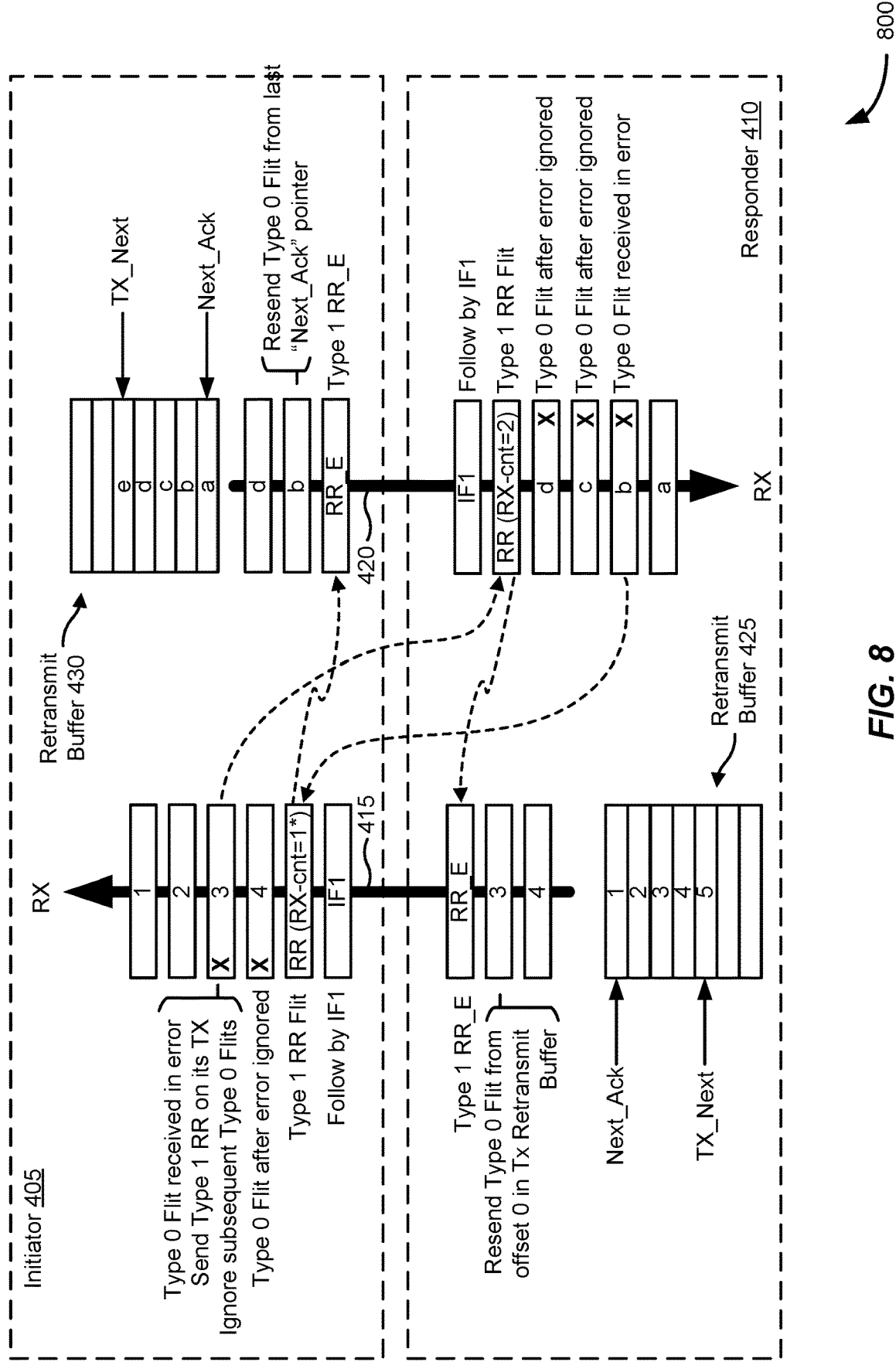
FIG. 8 is a message flow for error correction in chip-to-chip interfaces, according to an example.

FIG. 8 is a message flow 800 for error correction in chip-to-chip interfaces, according to an example. In one or more embodiments, message flow 800 is between an initiator die 405 and a responder die 410, as further described herein. In one or more embodiments, message flow 800 illustrates a Flit flow in a retransmission mode between the initiator 405 and responder 410, where an error is detected on both sides (e.g., errors detected by both initiator 405 and responder 410), and includes one or more of the elements of message flow 700.

In one or more embodiments, message flow 700 illustrates Request-to-Resend (RR) and recovery mechanism, including errors on both sides case. Reception of RR instead of RR_Ack indicates the case of errors on both sides of the link within the same error window.

Figure 9:
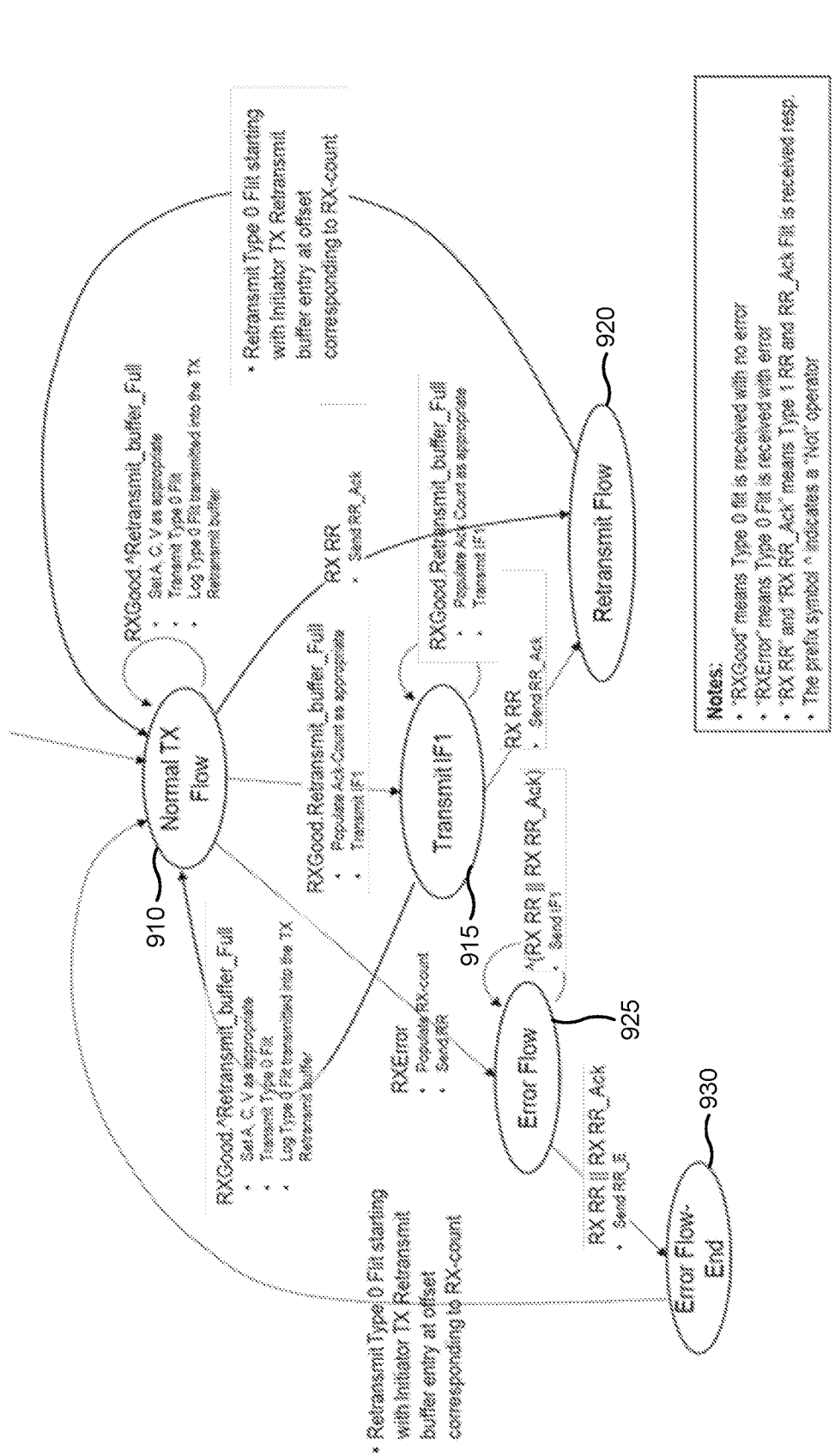
FIG. 9 is a transmitter state diagram for error correction in chip-to-chip interfaces, according to an example.

FIG. 9 is a transmitter state diagram 900 for error correction in chip-to-chip interfaces, according to an example. In the description of the transmitter state diagram 900 that follows, "RXGood" refers to Type 0 Flit is received with no error, "RXError" refers to Type 0 Flit is received with error, "RX_RR" refers to a Type 1 RR is received from the responder, and "RX_RR_Ack" refers to a Type 1 RR_Ack corresponding to the Type 1 RR.

In one or more embodiments, at 905, the transmitter (which may be initiator 405 or responder 410) starts, and proceeds to the normal TX flow state 910.

In the normal TX flow state 910, for as long as received Type 0 Flits are received without error and the retransmit buffer is not full, the A, C, V bits of message frame 201 and/or message frame 202 are set as appropriate for that message frame. Type 0 Flits are transmitted and logged into the TX retransmit buffer. Upon receipt of an RX RR, an RR_Ack Flit is transmitted and the transmitter transitions to the retransmit flow state 920.

From the transmit IF1 state 915, upon the retransmit buffer becoming full, and if received Type 0 Flits are received without error, the transmitter populates the acknowledgement count (Ack-count) data field for Acknowledge Flit (AF) Type 1command, and transmits IF1 (Type 1 Idle Flits) as "fillers," transitioning to the transmit IF1 state 915. While the retransmit buffer remains full and Type 0 Flits are received without error, the transmitter remains in the transmit IF1 state 915. Upon the retransmit buffer becoming no longer full, and for as long as received Type 0 Flits are received without error, the A, C, V bits of message frame 201 and/or message frame 202 are set as appropriate for that message frame. Type 0 Flits are transmitted and logged into the TX retransmit buffer, and the transmitter returns to the normal TX flow state 910. Upon receipt of an RX RR, an RR_Ack Flit is transmitted and the transmitter transitions to the retransmit flow state 920.

From the retransmit flow state 920, the transmitter transmits Type 0 Flits starting with the initiator TX retransmit buffer entry at an offset that corresponds to RX-Count.

In the normal TX flow state 910, if a Type 0 Flit is received with an error, the transmitter populates RX-count and sends a Type 1 RR to the receiver, and enters the error flow state 925.

While in the error flow state 925, as long as not (RX RR||RX RR_Ack) is true (e.g., as long as neither RR or RR_Ack is received), then the transmitter sends IF1 and the transmitter remains in the error flow state 925. While in the error flow state 925, if (RX RR||RX RR_Ack) is true (e.g., if either RR or RR_Ack is received), then the transmitter sends RR_E, and transitions to the error flow end state 930.

From the error flow end state 930, the transmitter sends a retransmit Type 0 Flit starting with initiator TX retransmit buffer entry at an offset that corresponds to RX-count, and transitions back to the normal TX flow state 910.

Figure 10:
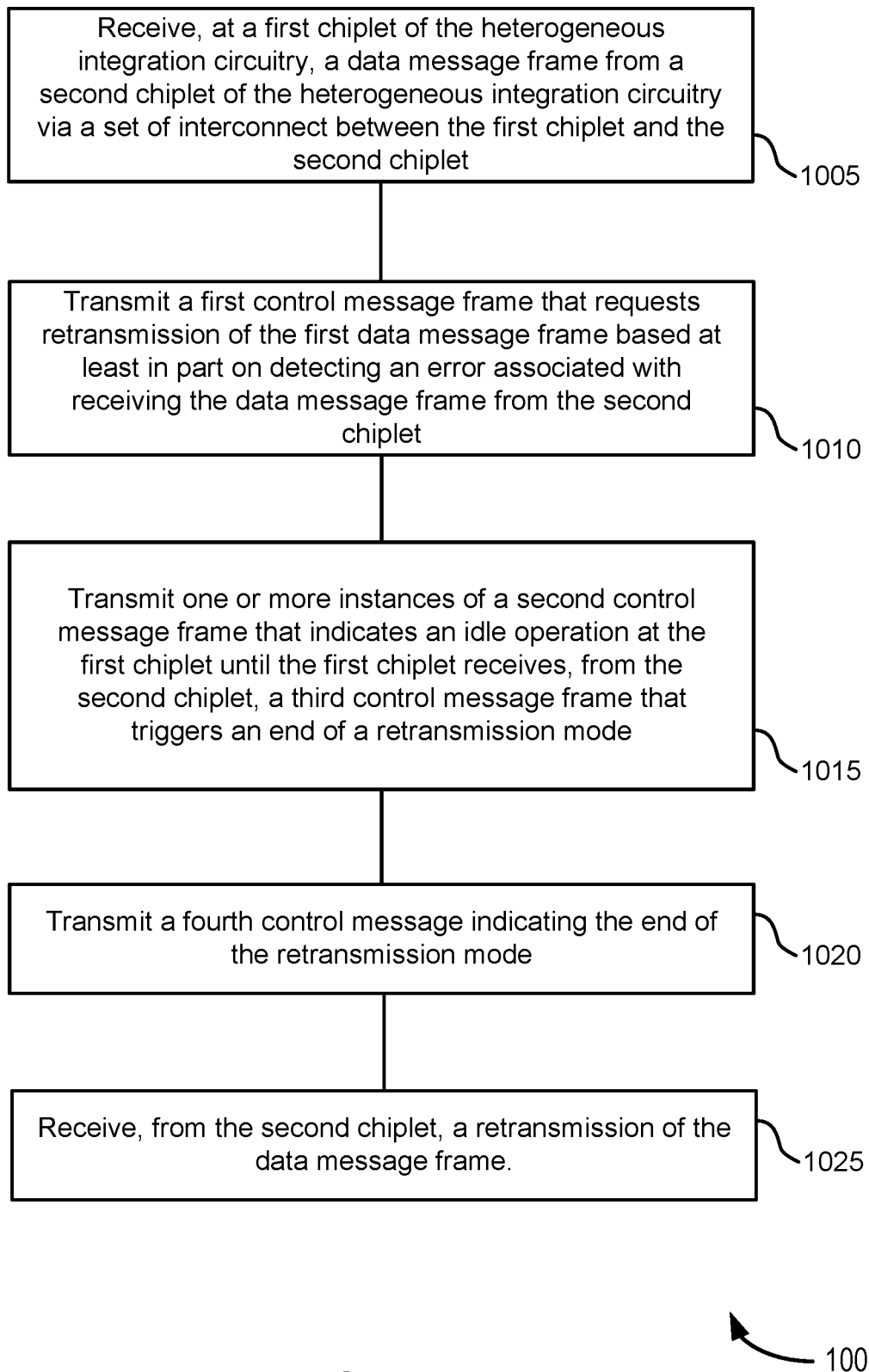
FIG. 10 is a flow diagram of a method for of error correction for chip-to-chip communications in a heterogeneous integration circuitry according to some examples To facilitate understanding, identical reference numerals have been used, where possible, to designate identical elements that are common to the figures. It is contemplated that elements of one example may be beneficially incorporated in other examples.

FIG. 10 is a flow diagram of a method 1000 for of error correction for chip-to-chip communications in a heterogeneous integration circuitry according to some examples. In one or more embodiments, a first chiplet (e.g., a chiplet 110, a component 145, responder 410) includes a first communications interface for chip-to-chip communications with a second communications interface of a second chiplet (e.g., a chiplet 110, a component 145, initiator 405) via a set of interconnect (e.g., an interconnect 120, a first set of interconnect lines 415, a second set of interconnect lines 420). In one or more embodiments, the first chiplet, the second chiplet, both, or any combination thereof, include communications controller circuitry (e.g., communications controller circuitry 130) for chip-to-chip communications between the first chiplet and the second chiplet, where the communications controller circuitry is configured to control the first communications interface, the second communications interface, or any combination thereof, to perform one or more steps of the method 1000.

At block 1005, the method includes receiving, at a first chiplet of the heterogeneous integration circuitry, a data message frame from a second chiplet of the heterogeneous integration circuitry via a set of interconnect between the first chiplet and the second chiplet.

At block 1010, the method includes transmitting a first control message frame that requests retransmission of the data message frame from the second chiplet (e.g., a first data message frame) based at least in part on detecting an error associated with receiving the data message frame from the second chiplet. In one or more embodiments, transmitting the first control message frame includes transmitting a plurality of instances of the first control message frame before transmitting the second control message frame. In some embodiments the data message frame to the second chiplet is a next data message frame queued up at the first chiplet for transmission to the second chiplet.

In one or more embodiments, transmitting the first control message frame includes transmitting a plurality of instances of the first control message frame before transmitting the second control message frame. In some embodiments an indication of a quantity of the plurality of instances are configured at the first chiplet.

At block 1015, the method includes transmitting one or more instances of a second control message frame that indicates an idle operation at the first chiplet until the first chiplet receives, from the second chiplet, a third control message frame that triggers an end of a retransmission mode. In one or more embodiments the third control message frame acknowledges receipt of the first control message frame at the second chiplet, triggering the end of the retransmission mode. In one or more embodiments the third control message frame requests retransmission of a data message frame from the first chiplet to the second chiplet, triggering the end of the retransmission mode. In some embodiments, both triggering conditions may be met (satisfied), trigger the end of the retransmission mode.

At block 1020, the method includes transmitting a fourth control message frame indicating the end of the retransmission mode.

At block 1025, the method includes receiving, from the second chiplet, a retransmission of the data message frame from the second chiplet.

In one or more embodiments, method 1000 further includes transmitting, to the second chiplet after transmitting the fourth control message frame, a data message frame to the second chiplet (e.g., a second data message frame) responsive to receiving the third control message frame that acknowledges receipt of the first control message frame. In some embodiments, the data message frame to the second chiplet is a next data message frame queued up at the first chiplet for transmission to the second chiplet.

In one or more embodiments, method 1000 further includes transmitting, to the second chiplet, a data message frame from the first chiplet via the set of interconnect. The method 1000 further includes receiving the third control message frame after transmitting at least one of the one or more instances of the second control message frame and before receiving an acknowledgment of receipt of the first control message frame, wherein the third control message frame requests retransmission of the data message frame to the second chiplet. The method 1000 further includes retransmitting the data message frame to the second chiplet responsive to the third control message frame and after transmitting the fourth control message frame.

In one or more embodiments, method 1000 further includes entering the retransmission mode responsive to detecting the error.

In one or more embodiments, both a first chiplet and a second chiplet are configured to perform, concurrently, error correction for chip-to-chip communications. In some embodiments, a first chiplet can perform one or more aspects of method 1000 (partially or entirely) concurrently with a second chiplet performing one or more aspects of method 1000.

In one or more embodiments, a protocol Initiator and Responder are separated by multiple links. In such case, an embodiment includes a retry mechanism for the multi-hop interface with intermediate stage(s) enforces CRC and retry mechanism at each hop. The CRC calculation happens at the transmitter. At the intermediate stages, CRC check logic is needed, but no CRC generation logic is needed (although it may be present for other links). However, each intermediate stage implements a FIFO to perform a retry locally. For any end-to-end error handling, the application layer uses individual transaction IDs to identify error transactions and subsequent processing.

While the foregoing is directed to specific examples, other and further examples may be devised without departing from the basic scope thereof, and the scope thereof is determined by the claims that follow.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving data message frames at a first die of a multi-die integrated circuit (IC) device, from a second die of the multi-die IC device;
detecting an error in a first one of the data message frames, by the first die;
transmitting a first control message frame, by the first die, requesting retransmission of the first data message frame;
transmitting second control message frames, by the first die, subsequent to the transmitting the first control message frame, indicating an idle operation at the first die;
receiving a third control message frame from the second die, by the first die, acknowledging the first control message frame;
halting the transmitting of the second control message frames based on the third control message frame;
transmitting a fourth control message frame, by the first die, indicating an end of a retransmission mode subsequent to the halting; and
receiving a retransmission of the first data message frame from the second die, by the first die, subsequent to the receiving the third control message frame.

2. The method of claim 1, further comprising:
transmitting a second data message frame, by the first die, subsequent to the transmitting the fourth control message frame.

3. The method of claim 2, wherein the second data message frame comprises a next data message frame queued up at the first die for transmission to the second die.

4. The method of claim 1, further comprising:
transmitting a second data message frame from the first die to the second die;
receiving a fifth control message frame from the second die, by the first die, during the transmitting the second control message frames, requesting retransmission of the second data message frame; and
retransmitting the second data message frame from the first die to the second die subsequent to the transmitting the fourth control message frame.

5. The method of claim 1, wherein the transmitting the first control message frame comprises:

transmitting a number of instances of the first control message frame prior to the transmitting the second control message frames.

6. The method of claim 5, wherein the transmitting the first control message frame comprises populating count fields of the number of instances of the first control message frames with an indication of the number of of the instances of the first control message frame.

7. The method of claim 1, further comprising:
entering the retransmission mode based on the detecting the error.

8. The method of claim 1, wherein the first die is further configured to perform error correction for chip-to-chip communications concurrently with error correction performed by the second die.

9. The method of claim 1, further comprising:
setting a depth of a first-in first-out (FIFO) buffer for communications between the first and second dies based at least in part on an error statistic for the communications between the first and second dies, wherein the error statistic comprises one or more of a bit error rate, a throughput, and a latency.

10. An integrated circuit device, comprising:
a first die configured to communicate with a second die via an interconnect, including to:
receive data message frames from the second die;
detect an error in a first one of the data message frames;
transmit a first control message frame that requests retransmission of the first data message frame from the second die;
transmit second control message frames that indicates an idle operation at the first die, subsequent to the transmission of the first control message frame;
receive a third control message frame from the second die, acknowledging the first control message frame;
halt the transmission of the second control message frames based on the third control message frame;
transmit a fourth control message frame indicating an end of a retransmission mode; and
receive a retransmission of the first data message frame from the second die, subsequent to receipt of the third control message frame.

11. The integrated circuit device of claim 10, wherein the first die is further configured to:
transmit a second data message frame subsequent to transmission of the fourth control message frame.

12. The integrated circuit device of claim 11, wherein the second data message frame comprises a next data message frame queued up at the first die for transmission to the second die.

13. The integrated circuit device of claim 10, wherein the first die is further configured to:
transmit a second data message frame to the second die;
receive a fifth third control message frame from the second die during the transmission of the second control message frames, requesting retransmission of the second data message frame; and
retransmit the second data message frame to the second die subsequent to the transmission of the fourth control message frame.

14. The integrated circuit device of claim 10, wherein the first die is further configured to:
transmit a number of instances of the first control message frame prior to the transmission of the second control message frames.

15. The integrated circuit device of claim 14, wherein the first die is further configured to populate count fields of the number of instances of the first control message frames with an indication of the number of the instances of the first control message frames.

16. The integrated circuit device of claim 10, wherein the first die is configured to:
enter the retransmission mode based on the detection of the error.

17. An integrated circuit device, comprising:
first and second dies comprising respective first and second interface circuitry configured to communicate with one another via an interconnect, wherein the first die is configured to:
receive data message frames from the second die;
detect an error in a first one of the data message frames;
transmit a first control message frame that requests retransmission of the first data message frame from the second die;
transmit second control message frames that indicate an idle operation at the first die, subsequent to the transmission of the first control message frame;
receive a third control message frame from the second die, acknowledging the first control message frame;
halt the transmission of the second control message frames based on the third control message frame;
transmit, to the second die, a fourth control message frame indicating an end of a retransmission mode; and
receive a retransmission of the first data message frame from the second die, subsequent to the receipt of the third control message frame.

18. The integrated circuit device of claim 17, wherein the first die is further configured to:
transmit a second data message frame subsequent to the receipt of the third control message frame.

19. The integrated circuit device of claim 18, wherein the second data message frame comprises a next data message frame queued up at the first die for transmission to the second die.

20. The integrated circuit device of claim 17, wherein the first die is further configured to:
transmit a second data message frame to the second die;
receive a fifth control message frame from the second die during the transmission of the second control message frames, requesting retransmission of the second data message frame; and
retransmit the second data message frame to the second die subsequent to the transmission of the fourth control message frame.

21. The integrated circuit device of claim 17, wherein the first die is further configured to:
transmit a number of instances of the first control message frame prior to the transmission of the second control message frames.

22. The integrated circuit device of claim 21, wherein the first die is further configured to populate count fields of the number of instances of the first control message frames with an indication of the number of the instances of the first control message frames.

23. The integrated circuit device of claim 17, wherein the first die is further configured to:
enter the retransmission mode based on the detection of the error.

24. The integrated circuit device of claim 17, wherein the first die is further configured to perform error correction for chip-to-chip communications, concurrently with error correction performed by the second die.

* * * * *